US007007043B2

(12) United States Patent
Farmer et al.

(10) Patent No.: US 7,007,043 B2
(45) Date of Patent: Feb. 28, 2006

(54) STORAGE BACKUP SYSTEM THAT CREATES MOUNTABLE REPRESENTATIONS OF PAST CONTENTS OF STORAGE VOLUMES

(75) Inventors: David Farmer, Boulder, CO (US); David Lee Trachy, Niwot, CO (US); Randy Pierce, Golden, CO (US); Marcia Reid Martin, Erie, CO (US)

(73) Assignee: Storage Technology Corporation, Louisville, CO (US)

( * ) Notice: Subject to any disclaimer, the term of this patent is extended or adjusted under 35 U.S.C. 154(b) by 479 days.

(21) Appl. No.: 10/329,199

(22) Filed: Dec. 23, 2002

(65) Prior Publication Data

US 2004/0133575 A1 Jul. 8, 2004

(51) Int. Cl.
*G06F 12/16* (2006.01)
(52) U.S. Cl. .................. 707/203; 707/201; 707/202; 707/204; 711/161; 711/162; 714/5; 714/6; 714/7; 714/8
(58) Field of Classification Search ............... 707/200, 707/201, 202, 203, 204, 205; 714/1, 2, 5, 714/6, 7, 8, 13, 20; 711/161, 162, 156, 147
See application file for complete search history.

(56) References Cited

U.S. PATENT DOCUMENTS

| 5,495,587 | A | * | 2/1996 | Comfort et al. ............ 712/228 |
| 5,500,806 | A | * | 3/1996 | Bellin et al. ................ 700/298 |
| 5,668,991 | A | * | 9/1997 | Dunn et al. ................. 707/202 |
| 5,724,581 | A | * | 3/1998 | Kozakura ................... 707/202 |
| 5,974,429 | A | * | 10/1999 | Strub et al. ................. 707/203 |
| 6,047,294 | A | * | 4/2000 | Deshayes et al. ........... 707/204 |
| 6,253,188 | B1 | | 6/2001 | Witek et al. .................. 705/14 |
| 6,490,598 | B1 | * | 12/2002 | Taylor ........................ 707/204 |
| 6,662,198 | B1 | * | 12/2003 | Satyanarayanan et al. .. 707/204 |
| 6,691,245 | B1 | * | 2/2004 | DeKoning ..................... 714/6 |
| 6,732,125 | B1 | * | 5/2004 | Autrey et al. ............... 707/204 |
| 6,738,757 | B1 | * | 5/2004 | Wynne et al. ................. 707/3 |
| 6,799,189 | B1 | * | 9/2004 | Huxoll ........................ 707/204 |
| 6,839,819 | B1 | * | 1/2005 | Martin ........................ 711/162 |
| 2003/0131253 | A1 | * | 7/2003 | Martin et al. ............... 713/200 |
| 2004/0107226 | A1 | * | 6/2004 | Autrey et al. ............... 707/204 |

OTHER PUBLICATIONS

"Schedule Program Diskette File Structure". IBM Technical Disclosure Bulletin, Jan. 1, 1987, vol 29, issue 8, pp. 3508-3511.*
"Schedule Program Diskette File Structure", IBM Technical Disclosure Bulletin, Jan. 1987, vol. 29, No. 9, pp. 3508-3511.
Wethington et al., "Special Edition Using Microsoft Excel 2000", QUE Corporation, 1999, pp. 171-176.

* cited by examiner

*Primary Examiner*—B. James Peikari
(74) *Attorney, Agent, or Firm*—Yee & Associates, P.C.

(57) ABSTRACT

A method, computer program product, and data management appliance for scheduling mountable point-in-time views of a storage volume is disclosed. A device external to the data processing system requests indentification information regarding available virtual views made of at least one primary storage device. The identification information is received from the device. The virtual views are incorporated into native filesystem associated with the data processing system. The identification information includes an alphanumeric name, creation date and time information, filesystem type, and access privileges.

21 Claims, 4 Drawing Sheets

US 7,007,043 B2

STORAGE BACKUP SYSTEM THAT CREATES MOUNTABLE REPRESENTATIONS OF PAST CONTENTS OF STORAGE VOLUMES

CROSS REFERENCE TO RELATED APPLICATIONS

The present invention is related to the following applications entitled "SCHEDULED CREATION OF POINT-IN-TIME VIEWS," U.S. patent application Ser. No. 10/329,223; "SCHEDULED CREATION OF POINT-IN-TIME VIEWS," U.S. patent application Ser. No. 10/329,253 all flied even date hereof, assigned to the same assignee, and incorporation herein by reference.

BACKGROUND OF THE INVENTION

1. Field of the Invention

The present invention is directed generally toward data storage and backup systems. More specifically, the present invention is directed toward a backup system that can create a number of mountable representations of past contents of storage volume.

2. Background of the Invention

A data replication system can provide an up-to the-minute duplicate copy or replica of changing data on a storage device. Write commands issued to a primary storage device are duplicated and issued to the data replication system, which records the written data in its own storage medium. The simplest form of data replication is a redundant "mirror" volume, which is itself a duplicate of the primary storage device. More sophisticated data replication systems store not only a current duplicate copy of the primary device but also allow additional past-time images or "point-in-time views" of the primary device to be accessed. This may be done through some kind of "journaling," where the write commands themselves are archived, rather than simply a copy of the data.

These data replication systems are powerful because they may allow for a virtually limitless number of point-in-time views representing different points in time. When a data replication system is shared among a group of users working together, it may be useful for the group to be able to work with a one or more point-in-time views and ensure that all users are accessing the same point-in-time views. For example, a group of programmers working on a large program may wish to be able to access a particular version of the source code to that program that existed at a particular time. Thus, a need exists for a system to produce commonly accessible, consistent point-in-time views for use by a group of users.

SUMMARY OF THE INVENTION

The present invention provides a method, computer program product, and data management appliance for scheduling mountable point-in-time views of a storage volume. A web-based administrative interface is provided for entering rules defining a scheduling policy under which point-in-time views are to be created and published among a network of computers. Publication of a single point-in-time view may be scheduled or a series of recurring point-in-time views may be scheduled. A naming scheme may be employed to create distinguishable recurring point-in-time views that are mounted as storage volumes or directories in a file system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed toward a method, computer program product, and apparatus for resuming a journaling process in a device that is capable of generating a number of "point-in-time views" of a storage volume representing the contents of the storage volume at a particular past point in time. Such a device, for the purposes of the present application is known as a data management appliance. One such data management appliance is described in Commonly assigned, co-pending U.S. patent application Ser. No. 10/034,305, entitled "DATA MANAGEMENT APPLIANCE," filed Dec. 28, 2001, now U.S. Pat. No. 6,839,819 which is hereby incorporated by reference. Typically, a data management appliance will perform two functions: First, a data management appliance captures write commands changing the contents of a primary storage device and journals the changes on a secondary storage device associated with the data management appliance. Second, a data management appliance computes "virtual view" representations or "replicas" of the contents of the primary storage device at particular times in the past. A "virtual view" maps logical addresses on the primary storage device into the contents of those addresses at a given point in time in the past. One of ordinary skill in the art will appreciate that the data management appliance need not be capable of computing a "virtual view" for every point in time in the past. Preferably, a data management appliance will be capable of producing virtual views with finer time-granularity for recent times (i.e., more virtual views will be available for recent times than times further in the past), but this is not a requirement either.

Figure 1:
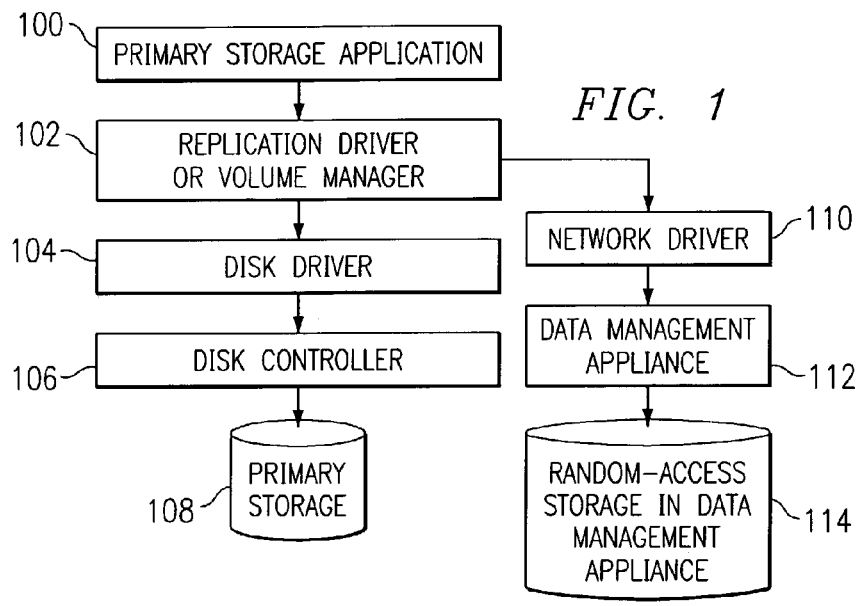
FIG. 1 is an overall view of the operation of a data management appliance in accordance with a preferred embodiment of the present invention.

FIG. 1 is a diagram providing an overall view of the normal operation of a data management appliance in accordance with a preferred embodiment of the present invention. A primary storage application 100, residing on a host computer system, submits a command to a replication driver/volume manager 102 to store data to primary storage 108. Replication driver/volume manager 102 relays the request both to disk driver 104 and network driver 110. Disk driver 104 is a device driver code that operates disk controller 106, which in turn controls primary storage 108, which is in this case a disk drive, although many different alternative random-access storage devices could be used in place of primary storage 108.

Network driver 110 is device driver code that controls access to a computer network. Network driver 110 relays the submitted storage command to data management appliance 112, which is located on a network associated with the host computer system. Data management appliance 112 is an intelligent peripheral device that presents the appearance on the network of a disk array or arrays or other random-access storage medium. Data management appliance 112 contains control circuitry and also contains its own random-access storage 114. The control circuitry may be, for instance, an embedded stored-program computer, such as a microprocessor and memory or a microcontroller. The stored program may be stored in firmware or loaded from a storage medium, such as CD-Rom. Data management appliance 112, through control circuitry, uses random-access storage 114 to replicate the information stored on primary storage 108. As will be seen, data management appliance 112 not only provides a replica of the current contents of primary storage 108, but it also contains information that it can use to reconstruct replicas of previous contents of primary storage 108 at various past points in time.

Figure 2:
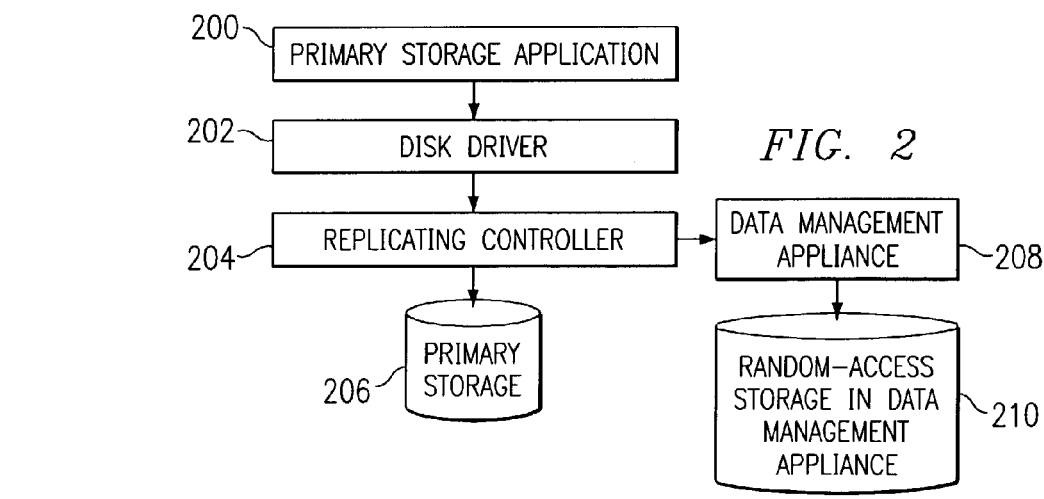
FIG. 2 is an overall view of the operation of an alternative embodiment of the present invention in which commands are replicated using a replicating controller.

FIG. 2 is a diagram of an alternative embodiment of the present invention, in which the replication driver is replaced with replicating hardware. Primary storage application 200 issues a write command to disk driver 202, which is device driver code. Disk driver 202 controls replicating controller 204, which is a hardware disk controller that controls primary storage 206, but which has the additional feature of replicating storage commands submitted to primary storage 206 and providing the replicated commands to data management appliance 208, which replicates the data contained on primary storage 206 on random-access storage 210.

Figure 3:
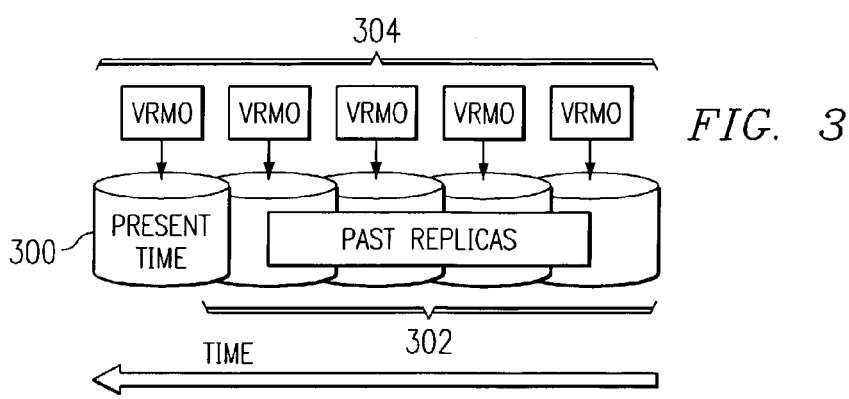
FIG. 3 is a diagram providing a conceptual view of the replicated storage provided by a data management appliance in accordance with a preferred embodiment of the present invention.

FIG. 3 is a diagram providing a conceptual view of the replicated storage provided by data management appliance 112 (or 208). Data management appliance 112 is programmed to behave as though it stores a number of duplicate copies (called replicas or virtual views) of primary storage device 108 as it existed at certain points in time (replicas 300, 302). Data management appliance 112 can provide a near-time (i.e., near the present time) replica (300) of primary storage device 108 or any one of a number of virtual views or mirrors of earlier versions of the data stored on primary storage device 108. Each of these virtual mirrors is accessed using one of a number of virtual recovery mapping objects (VRMOs) 304, which each represent a different point in time.

Data may be read from data management appliance 112 by either specifying that data management appliance 112 behave (for reading purposes) as a copy of primary storage device 108 at a specified time (e.g., during the mounting process), or by specifying read commands that contain an additional time field. For example, to retrieve the contents of block 5 at some time "t," either data management appliance 112 could be directed to behave as if it were time "t," in which case any read command to any block would result in the data that was present at time "t," or a read command that simply stated "retrieve block 5 from time 't'" could be issued instead.

A number of schemes are available for providing replicated storage in a data management appliance in accordance with the present invention. Commonly assigned, co-pending U.S. patent application Ser. No. 10/034,305, entitled "DATA MANAGEMENT APPLIANCE," filed Dec. 28, 2001, now U.S. Pat. No. 6,839,819 which is hereby incorporated by reference, describes a data management appliance using a "Mirror-in-the-Middle" replication scheme. A mirror-in the-middle (MIM) included in the data management appliance is used to record an exact copy of the primary storage system at some fixed point in time.

Atomic write events in the "Mirror-in-the-Middle" scheme are recorded in a "forward journal" by the appliance immediately, so that data is always protected essentially as soon as it is created. An atomic event or transaction is one that cannot be divided into parts; an atomic event or transaction is either performed in its entirety or not performed at all. At specified points in time, forward journal entries are used to produce snapshots, reflecting the change in the primary storage system over a period of time. These snapshots are recorded in a "backward journal" and represent a coarser level of backup granularity, much like an incremental backup. As snapshots are produced, the forward journal entries are applied to the MIM to update its contents and finally discarded to save space.

Another data replication scheme, "Intrinsic Data Protection," is described in U.S. Pat. No. 6,732,125, Ser. No. 09/657,291, filed Sep. 8, 2000, entitled "SELF ARCHIVING LOG STRUCTURED VOLUME/INTRINSIC DATA PROTECTION," which is hereby incorporated by reference. Intrinsic Data Protection makes use of a "self-archiving log-structured volume," which records the results of every write event in a new location in primary storage, forming a chronological log of the state changes the volume undergoes. The self-archiving log-structured volume records in the log the points in time (synch events) when the blocks of the self-archiving log-structured volume are in a consistent state with respect to the primary storage system. Inactive segments of the log may be migrated to a backing store, and a replica may be reconstructed from a fixed number of log segments.

The present invention is directed toward a system for producing published point-in-time views of a primary storage device through the use of a data management appliance. Although a data management appliance may be capable of producing a replica or virtual view of an arbitrary point in time in response to a user request, in some cases it may be useful to make a limited number of virtual views "publicly available," or available to a number of users as if mounted as a network-available storage device, for instance. In this document, a virtual view corresponding to a particular point in time is referred to as a "point-in-time view." The process of making a point-in-time view publicly available is referred to as "publishing" the point-in-time view. The present invention allows for the scheduled creation of point-in-time views using a web-based administrative interface and the publication of such views with automatically-generated distinguishable names for easy access by clients mounting the point-in-time views.

Figure 4:
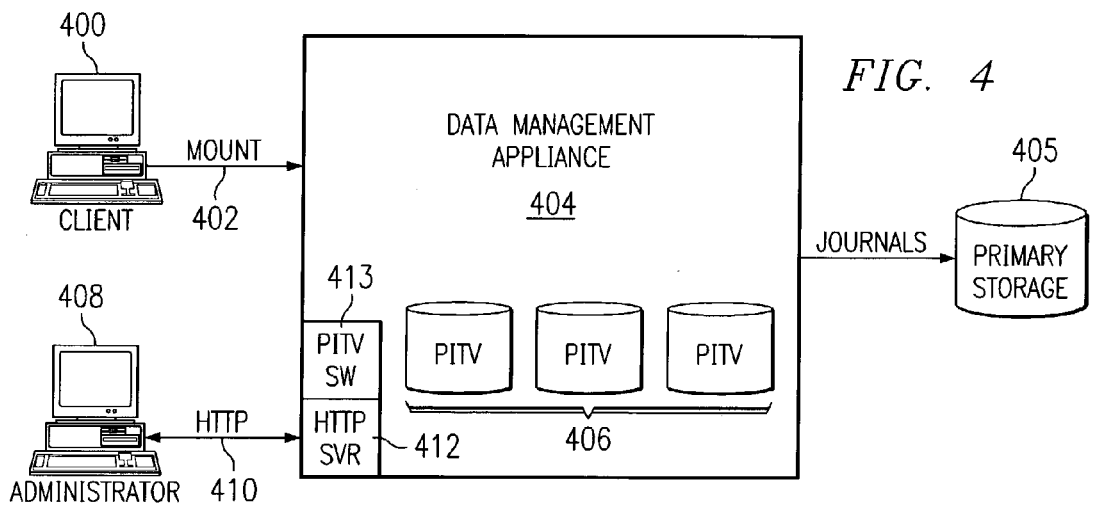
FIG. 4 is a diagram of a system for the scheduled production of published point-in-time views in accordance with a preferred embodiment of the present invention.

FIG. 4 is a diagram of a system for the scheduled production of published point-in-time views in accordance with a preferred embodiment of the present invention. A client computer system 400 mounts (402) published point-in-time views 406 of a primary storage volume 405 that are stored on a data management appliance 404. To mount a storage device means to make the storage device available to the computer that is mounting the device. From the point of view of client computer system 400, each of published point-in-time views 406 appears as a network attached storage device or as a directory within a native hierarchical file system such as that provided by Microsoft Windows 2000, an operating system produced by Microsoft, Inc. of Redmond, Wash.

An administrative computer system 408 manages the creation of point-in-time views 406. Administrative computer system 408 communicates (410) with data management appliance 404 via an HTTP server 412 executing on data management appliance 404. HTTP stands for "HyperText Transfer Protocol" and is the primary application-level communications protocol through which documents are transferred over the World-Wide Web. HTTP browser software (not shown) on administrative computer system 408 is used to display a user interface on administrative computer system 408 for scheduling the creation of point-in-time views 406. For example, point-in-time views may be scheduled to be created at a particular time or according to a recurring pattern of occurrence. Scheduling rules are acquired from an administrator on a web browser connected to computer system 408 (which could alternatively be substituted with a dumb terminal). and transmitted to data management appliance 404 via HTTP server 412.

The scheduling options received by HTTP server 412 are forwarded to point-in-time view software 413 operating on data management appliance 404. Point-in-time view software 413 directs data management appliance to create mountable point-in-time views of primary storage 405 according to the scheduling rules. These mountable point-in-time views can then be mounted or otherwise accessed by client 400 or a number of client computer systems as permitted by the rule.

Figure 5:
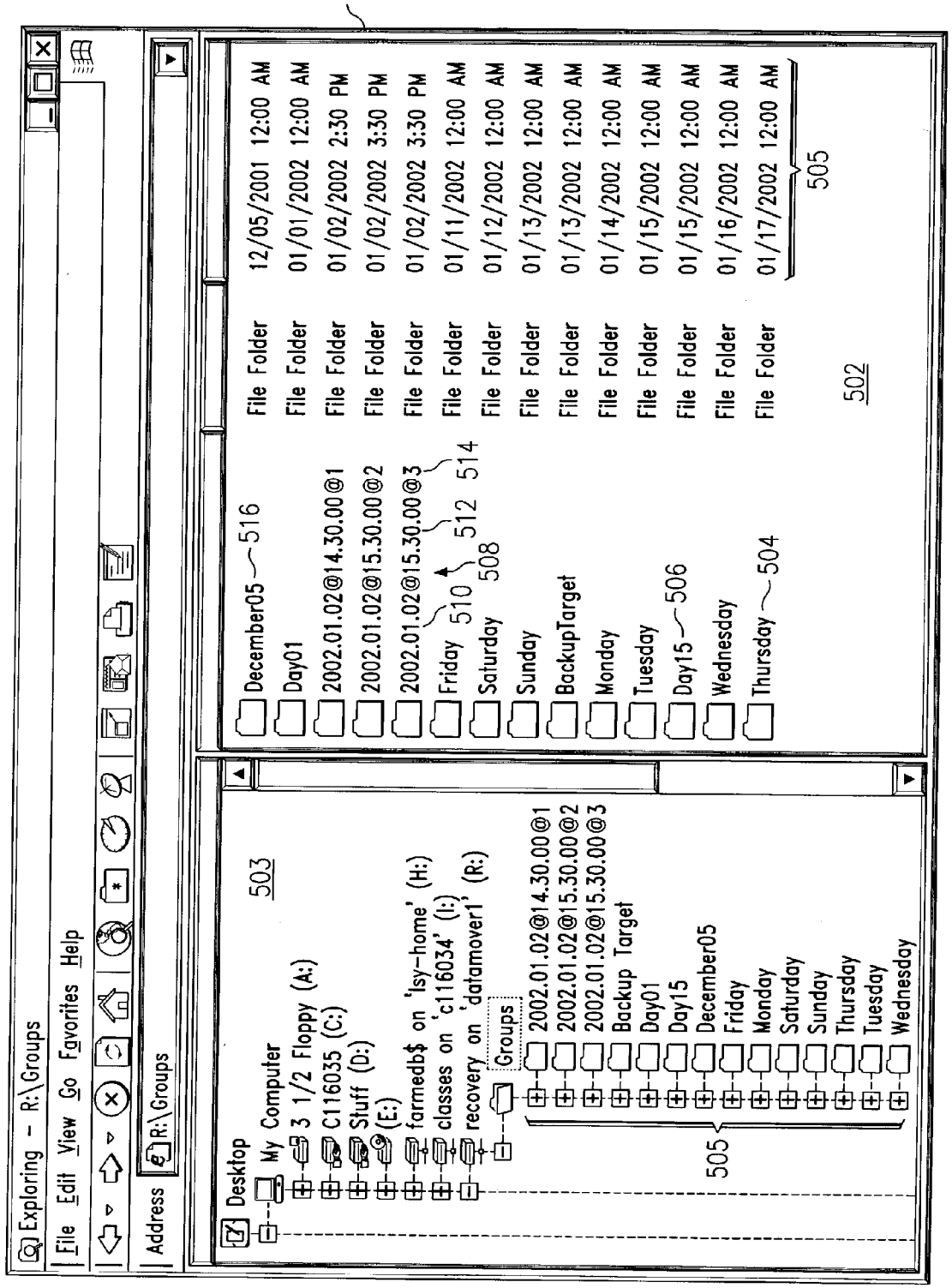
FIG. 5 is a diagram of a directory display 500 on client computer system 400 showing mounted published point-in-time views generated in accordance with a preferred embodiment of the present invention.

FIG. 5 is a diagram of a directory display 500 on client computer system 400 showing mounted published point-in-time views generated in accordance with a preferred embodiment of the present invention. Directory display 500 is representative of a display produced by an operating system employing a graphical user interface, such as Microsoft Windows 2000. A directory panel 502 lists a number of published point-in-time views 505 mounted by client computer system 400 and accessible as part of the operating system's ordinary file system. Hierarchical display panel 503 shows that published point-in-time views are here mounted as directories in a hierarchical file system.

Each of the published point-in-time views 505 is named according to an automated naming scheme. Although not a necessary component of a scheduled point-in-time view creation system, an automated naming scheme facilitates the creation of a number of point-in-time views following a recurring pattern. Point-in-time view 504, for example, is named "Thursday" and is one of a group of point-in-time views named for days of the week. This group of point-in-time views provides a week's worth of daily point-in-time views, with each point-in-time view being superceded weekly. For example, point-in-time view 504 has a date of Jan. 17, 2002. On Jan. 24, 2002, one week later, point-in-time view 504 will be superseded by a new point-in-time view representing the contents of the primary storage device on Jan. 24, 2002. The new point-in-time view will be called "Thursday" as well.

Point-in-time view 506, named "Day15" represents a different recurrence pattern. Point-in-time view 506 represents the fifteenth in a series of numbered daily point-in-time views. For example, under a schedule for creating daily backups over a month, "Day15" may represent the 15th day of the month. A different period, other than a month, such as the number of days in a school semester, may also be used, or no recurring period may be used (with each day being numbered consecutively from some initial point). Instead of a simple day-of the-month, a month-day combination may be used as well, such as with point-in-time view 516 for scheduling yearly updates.

A naming scheme based on absolute dates and times may be used as well. For example, point-in-time view 508 is named for the absolute time that it represents. The name of point-in-time view 508 includes a date 510 and time 512, as well as an additional number 514 to allow different point-in-time views corresponding to the same date and time to coexist. Date 512, time 512, and number 514 are shown separated by "@" symbols, but any number of different separator characters or no separator characters at all may be used in an actual embodiment.

Figure 6:
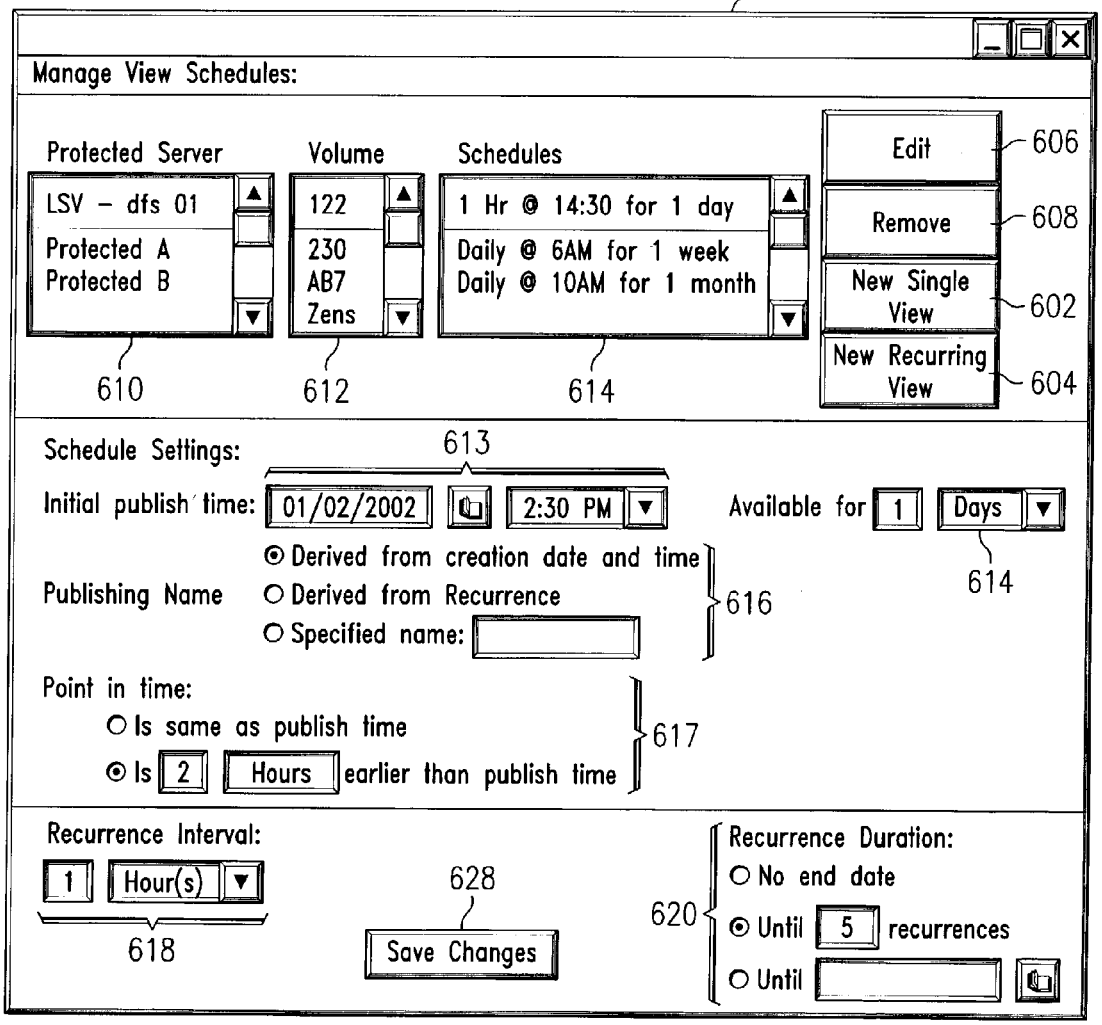
FIG. 6 is a diagram depicting a web browser window displaying a web document providing a user interface for defining a policy for the publication of point-in-time views in accordance with a preferred embodiment of the present invention.

FIG. 6 is a diagram depicting a web browser window 600 displaying a web document providing a user interface for defining a policy for the publication of point-in-time views in accordance with a preferred embodiment of the present invention. An administrator utilizes the user interface to define rules for the publication of point-in-time views, which are submitted to data management appliance 404 via HyperText Transfer Protocol (HTTP), as depicted in FIG. 4.

A number of rules for the publication of point-in-time views are listed in "Schedules" listbox 614, corresponding to the particular storage volume selected in "Volumes" listbox 612, the volumes being those associated with the currently selected server in "Protected Server" listbox 610. In a preferred embodiment, the name of the volume and its corresponding protected server together constitute a unique identification of a storage volume. One of ordinary skill in the art will recognize that storage volumes within a networked data processing system may be identified in a number of different ways; the identification scheme depicted in FIG. 6 is merely an example of one possible scheme for identifying storage volumes.

Additional controls are provided for defining and/or editing the specifics of a particular rule for publishing point-in-time views. "Initial Publish Time" control 613 allows a time to be entered for the first point-in-time view to be published according to the currently-edited rule. An "Available For" control 614 allows a duration of availability to be defined for the published point-in-time view.

"Published Name" control 616 allows a naming scheme (such as the naming schemes depicted in FIG. 5) to be selected for the point-in-time views published in accordance with the currently-edited rule. In the preferred embodiment depicted in FIG. 6, "Published Name" control 616 allows the names to be derived from the absolute creation date and time of the point-in-time view, the relative creation date and time of the point-in-time view in relation to a recurring publication of point-in-time views, or from a user-specified string. "Point-in-time" control 617 allows a time other than the publication time to be the time represented by the point-in-time view. For example, a rule may be established that specifies that point-in-time views are to be published 2 hours after the point in time represented by the point-in-time view.

"Recurrence Interval" control 618 allows an interval between recurring publications of point-in-time views to be specified, such as number of weeks, days, hours, minutes, months, or years. "Recurrence Duration" control 620 allows an end date (if any is desired) of the recurring point-in-time views to be specified. For example, if only five recurrences are required, "Recurrence Duration" control 620 may be used to specify only five recurrences are to be made. "Recurrence Duration" control 620 may also be used to specify a date at which recurrences are to cease.

In the embodiment described in FIG. 6, one creates a new rule by specifying parameters with controls 613, 614, 616, 617, 618, and 620 then actuating one of buttons 602 and 604. Actuating "New Single View" button 602 causes a single point-in-time view to be scheduled. Actuating "New Recurring View" 604 causes recurring point-in-time views to be scheduled according to the recurrence parameters specified by controls 618 and 620.

An existing rule may be edited by using controls 610, 612, and 614 to select the rule, and actuating "Edit" button 606. Actuating edit button 606 causes the parameters of the rule to be displayed in controls 613, 614, 616, 617, 618, and 620, where they may be edited. Actuating "Save Changes" button 628 causes the changes to the rule to be saved. Similar to "Edit" button 606, "Remove" button 608 may be used to remove a rule.

Figure 7:
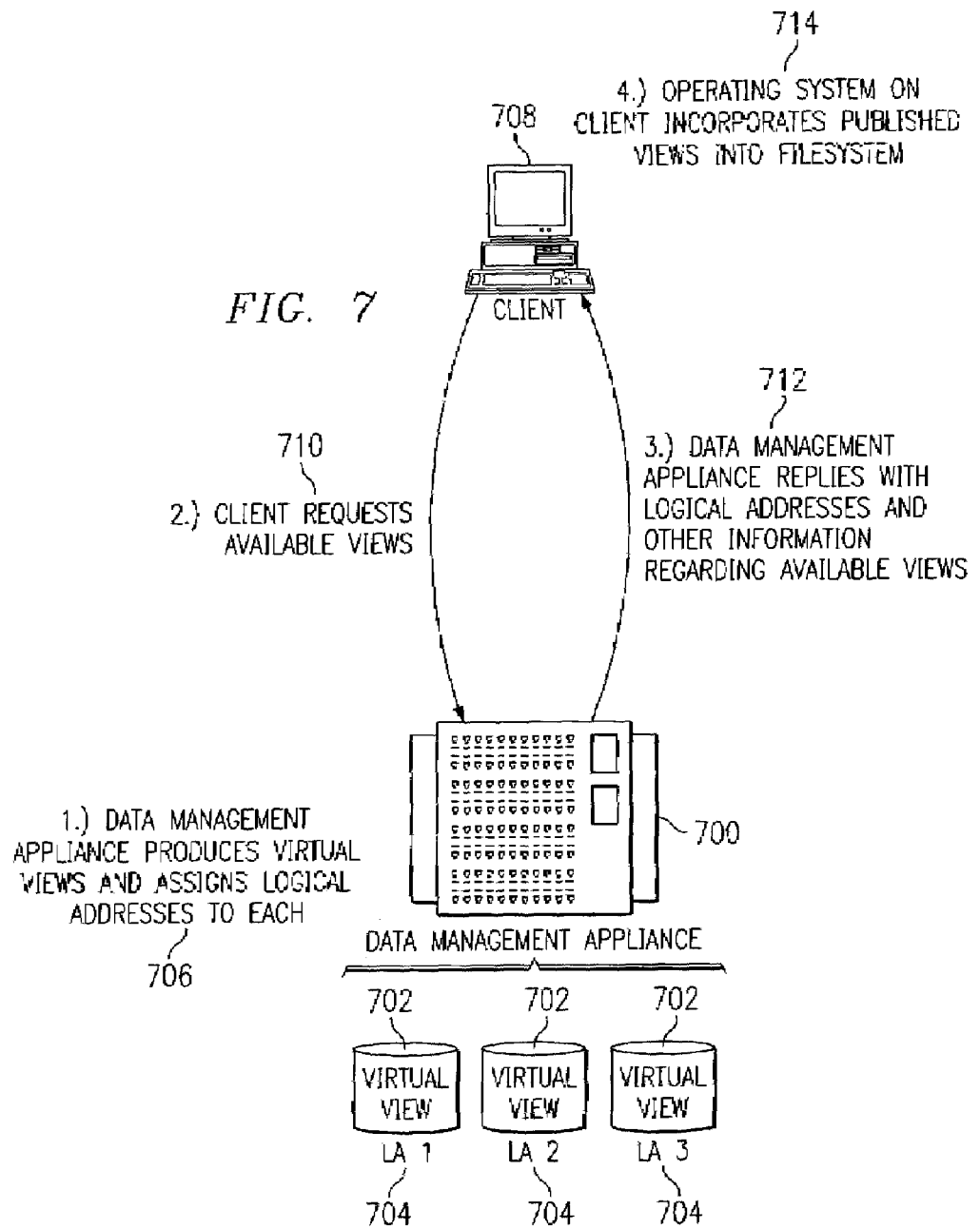
FIG. 7 is a diagram of a process of publishing one or more virtual views in accordance with a preferred embodiment of the present invention.

Publishing virtual views in the context of a preferred embodiment of the present invention is a relatively straightforward process. FIG. 7 is a diagram depicting a process of publishing one or more virtual views in a preferred embodiment of the present invention.

Periodically, data management appliance 700 will produce virtual views 702 according to data management appliance 700's established publication policy and assign logical addresses 704 to each of virtual views 702 (step 706). Logical addresses 704 are device addresses that allow each of virtual views 702 to be distinguished among other available storage volumes. For example, in a storage system based on SCSI (Small Computer System Interface), logical addresses 704 may be LUNs (Logical Unit Numbers). In a storage area network (SAN), logical addresses 704 may be network addresses, such as IP (Internet Protocol) addresses. Periodically, client 708 will request a list of available views from data management appliance 700 (step 710). Client 708 may poll data management appliance 700 at pre-determined intervals to request available views or client 708 may make the request in response to some event, such as a message broadcasted over a network, for instance.

In response to the request, data management appliance 700 returns the logical addresses and other pertinent information regarding available virtual views (step 712). Such pertinent information regarding available virtual views may include, but is not limited to, alphanumeric names, creation date and time information, filesystem format or type (e.g, VFAT [Virtual File Allocation Table], NTFS [New Technology File System], ext2fs [Second Extended File System], etc.), access privileges, and the like. Upon receiving the information from data management appliance 700, an operating system executing on client 708 may then incorporate desired available virtual views into its filesystem. This may be done by creating a new device designation to represent a virtual view, such as a new drive letter (e.g., C:, D:, etc.) in the Microsoft Windows operating system, or by adding a virtual view as a subdirectory in some hierarchical directory structure, or via any other appropriate means of incorporating a device or filesystem into another filesystem. Incorporating a device or filesystem into another filesystem is also sometimes referred to as "mounting" the device or filesystem, particularly with respect to UNIX-derived operating systems such as the freely-available Linux operating system or AIX (Advanced Interactive Executive), which is available from IBM Corporation of Armonk, N.Y.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system comprising:
requesting, from a device external to the data processing system, identification information regarding available virtual views made of at least one primary storage device;
receiving from the device the identification information;
incorporating the virtual views into a native filesystem associated with the data processing system; and
wherein the identification information includes an alphanumeric name, creation date and time information, filesystem type, and access privileges.

2. The method of claim 1, wherein the identification information includes a logical address for a virtual view.

3. The method of claim 2, wherein the logical address includes a logical unit number.

4. The method of claim 1, wherein the native filesystem is associated with an operating system operating on the data processing system.

5. The method of claim 1, wherein the virtual view is incorporated into the native filesystem by associating a device designation in the native filesystem with the virtual view.

6. The method of claim 5, wherein the device designation is a drive letter.

7. The method of claim 1, wherein the virtual view is incorporated into the native filesystem by associating a directory name in the native filesystem with the virtual view.

8. A computer program product in a computer-readable medium comprising functional descriptive material that, when executed by a computer, enables the computer to perform acts including:

requesting, from a device external to the data processing system, identification information regarding available virtual views made of at least one primary storage device;

receiving from the device the identification information;

incorporating the virtual views into a native filesystem associated with the data processing system; and wherein the identification information includes an alphanumeric name, creation date and time information, filesystem type, and access privileges.

9. The computer program product of claim 8, wherein the identification information includes a logical address for a virtual view.

10. The computer program product of claim 9, wherein the logical address includes a logical unit number.

11. The computer program product of claim 8, wherein the native filesystem is associated with an operating system operating on the data processing system.

12. The computer program product of claim 8, wherein the virtual view is incorporated into the native filesystern by associating a device designation in the native filesystem with the virtual view.

13. The computer program product of claim 12, wherein the device designation is a drive letter.

14. The computer program product of claim 8, wherein the virtual view is incorporated into the native filesystem by associating a directory name in the native filesystem with the virtual view.

15. A data processing system comprising:

means for requesting, from a device external to the data processing system, identification information regarding available virtual views made of at least one primary storage device;

means for receiving from the device the identification information;

means for incorporating the virtual views into a native filesystem associated with the data processing system; and wherein the identification information includes an alphanumeric name, creation date and time information, filesystem type, and access privileges.

16. The data processing system of claim 15, wherein the identification information includes a logical address for a virtual view.

17. The data processing system of claim 16, wherein the logical address includes a logical unit number.

18. The data processing system of claim 15, wherein the native filesystem is associated with an operating system operating on the data processing system.

19. The data processing system of claim 15, wherein the virtual view is incorporated into the native filesystem by associating a device designation in the native filesystem with the virtual view.

20. The data processing system of claim 19, wherein the device designation is a drive letter.

21. The data processing system of claim 15, wherein the virtual view is incorporated into the native filesystem by associating a directory name in the native filesystem with the virtual view.

* * * * *